United States Patent

[11] 3,548,985

| [72] | Inventors | Helmut Espenschied<br>Buhlertal;<br>Georg Rothfuss, Ditzingen, Germany |
|---|---|---|
| [21] | Appl. No. | 784,362 |
| [22] | Filed | Dec. 17, 1968 |
| [45] | Patented | Dec. 22, 1970 |
| [73] | Assignee | Robert Bosch G.m.b.H.<br>Stuttgart, Germany |
| [32] | Priority | Dec. 21, 1967 |
| [33] | | Germany |
| [31] | | No. 1,625,690 |

[54] TORQUE TRANSMITTING DEVICE
10 Claims, 3 Drawing Figs.

[52] U.S. Cl. .................................................. 192/84,
192/107
[51] Int. Cl. ..................................................... F16d 27/10
[50] Field of Search............................................ 192/84(All)
107(M); 188/163

[56] References Cited
UNITED STATES PATENTS

| 2,039,714 | 5/1936 | Fuller............................ | 192/84(C) |
| 3,177,998 | 4/1965 | Rossez........................ | 192/107(M)(X) |
| 3,324,982 | 6/1967 | Mason et al. ................. | 192/84(C) |
| 3,361,238 | 1/1968 | Yokel........................... | 192/84(C) |
| 3,426,875 | 2/1969 | Sturmer....................... | 192/84(A1)(X) |

Primary Examiner—Allan D. Hermann
Attorney—Michael S. Striker

ABSTRACT: A disc carrying friction linings consisting of sintered iron is located between two driven members connected for rotation and for relative axial movement so that when a magnetic flux passes through the two rotary members and the sintered iron of the linings, the two rotary members are attracted to each other and press against the linings whereby torque is transmitted from the driven rotary members to the linings and the disc.

PATENTED DEC22 1970          3,548,985

INVENTOR.
Helmut Espenschied
Georg Rothfuss

3,548,985

TORQUE TRANSMITTING DEVICE

BACKGROUND OF THE INVENTION

The present invention relates to an electromagnetically operable torque transmitting device which is advantageously used as clutch or as brake of a motor car.

Electromagnetically operable friction disc clutches are known in which a stationary electromagnet includes a circular winding and a circular magnetizable body disposed concentric with the axis of the drive shaft of the clutch. When the winding is energized, the clutch is moved to a disengaged position against the action of spring means acting on a friction disc. Electromagnetic multiple disc clutches are also known in which the magnetic flux permeates the discs in the peripheral region so that the discs abut each other and transfer the torque. The friction discs are made of steel and do not have linings or facings so that the discs rapidly deteriorate due to the heat developed by friction, particularly if the clutch is operated under conditions in which great slippage occurs between the driving and the driven friction discs.

SUMMARY OF THE INVENTION

It is one object of the invention to provide an electromagnetic torque transmitting device of simple construction which is not subject to great wear, and has a long span of life.

Another object of the invention is to provide a torque transmitting device with linings or facings having a very high resistance to wear, while having properties permitting the flowing of a magnetic flux through the same.

With these objects in view, the present invention relates to a torque transmitting device including at least one disc carrying linings consisting of sintered iron which are located in the path of the magnetic flux by which a drive member is brought into friction contact with the linings.

It has been found that sintered iron produced in the usual manner, can be used for high quality friction linings which have substantial advantages regarding frictionally transmitted power, heat stress, and a high friction coefficient as compared with known friction clutches so that the number of friction discs can be advantageously reduced to a single friction disc whereby a simple and compact construction is achieved.

One embodiment of the invention comprises rotary means, referably including a pair of rotary members connected for rotation and relative axial movement, friction means including friction linings consisting of sintered iron located opposite the rotary means, preferably between the rotary members, and electromagnetic means for producing a magnetic flux through the rotary means and the friction linings.

When the two rotary members are pressed against opposite sides of a friction disc carrying the friction linings of sintered iron, torque is transmitted from the rotary means to the friction disc.

The rotary means are preferably driven, for example by the shaft of a combustion engine, and if the disc is connected to another shaft, the device serves as a clutch. If the disc is stationarily mounted, the device serves as a brake.

In the preferred embodiment, the disc between the rotary members has cutouts through which anchoring connecting portions of linings located on opposite sides of the disc pass for anchoring the linings. The linings and connecting portions are integral. Sintered iron powder is pressed by molds from opposite sides of the disc into the cutouts while the molds simultaneously form the lining portions on both sides of the disc.

Preferably, the lining portions are arranged in two concentric rows, each lining portion being part-circular. Pairs of lining portions on opposite sides of the disc have the same circumferential length and radial width, and are connected by a plurality of connecting portions passing through cutouts. The magnetic flux passes in one axial direction through the outer pair of lining portions and the respective connecting portions, and in the opposite direction to the radially inner pair of lining portions and the respective connecting portions.

The rotary drive member on one side of the disc carrying the frictional linings has a circular groove concentric with the axis of rotation, and a stationary electromagnetic means, including a circular magnetizable body and a circular winding, is arranged in the groove. Upon energization of the electromagnetic means, magnetic flux flows through both rotary members and through the sintered iron linings between the same so that rotary members are pressed from opposite sides against the linings, and torque is transmitted to a disc carrying the linings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
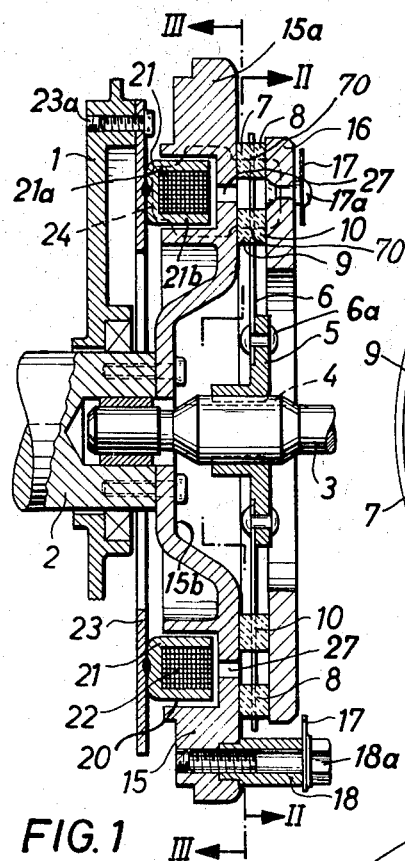
FIG. 1 is an axial sectional view illustrating a torque transmitting device according to one embodiment of the invention.

The drawing illustrates only the essential parts of a clutch incorporating the torque transmitting device of the invention. Only a portion of the crank shaft casing 1 of a combustion engine, not shown, is illustrated in FIG. 1. The crank shaft 2 of the combustion engine is mounted in a roller bearing of the crank shaft housing 1 and has an end portion to which a first rotary member 15 is secured by screws. Rotary member 15 has a central portion 15b with a central opening registering with a central recess in drive shaft 2 in which an output shaft 3, connected with a gear transmission, not shown, is mounted for rotation. Shaft 3 has a key groove 4 cooperating with a key portion of a hub 5 of a friction means which includes a disc 6 secured by rivets 6a to hub 5.

Figure 2:
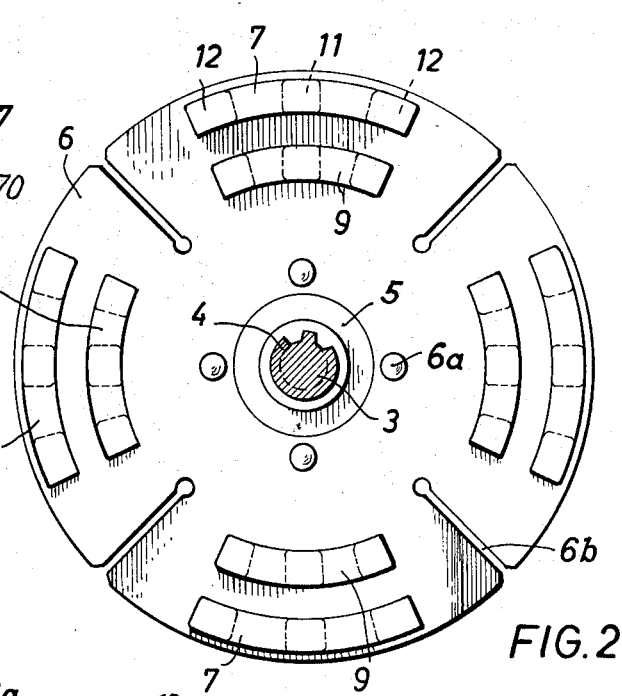
FIG. 2 is a cross-sectional view taken on line II–II in FIG. 1.

As best seen in FIG. 2, disc 6 has four circumferentially spaced radial slots 6b by which the outer part of disc 6 is divided into sectors. Disc 6 is made of a thin steel plate or sheet and has part-circular circumferentially extending lining portions 7,9 on one side, and 8,10 on the other side. Pairs of lining portions 7,8 and 9,10, respectively, have the same radial width and circumferential length and register exactly with each other while located in opposite sides of the disc 6. The respective covered areas of disc 6 are provided with two outer cutouts 12 and with a central cutout 11 which are covered by the pairs of linings 7,8 and 9,10, and in which axially extending anchoring connecting portions 70 are located for connecting pairs of linings, respectively on disc 6. The lining portions of each pair, and the connecting portions connecting the same, form an integral piece of sintered iron which is secured to and anchored in the cutouts 11,12 of disc 6 by a molding operation. The circumferential ends of lining portions 7,8 and 9,10 are aligned along radial lines, and separated from each other by slots 6 b. The pairs of outer lining portions 7,8 are disposed in a circular row having a greater diameter than the circular row along which the lining portions 9,10 are located. The two concentric circular rows of lining portions are arranged along two imaginary circles in which also cutouts 11,12 and connecting anchoring portions 70 are located. The friction means 6 to 12 is located between the rotary member 15 which is connected to and driven by crank shaft 2, and a second rotary member 16.

A spring steel disc 17 is secured by rivets 17a to four circumferentially spaced points of rotary member 16, and four intermediate points of spring steel disc 17, are pressed by screws 18a engaging threaded bores in rotary member 15 against bushings 18 so that steel disc 17 is fixedly secured to rotary member 15 for rotation with the same, whereby rotary member 16 is also connected with rotary member 15 for rotation, but is movable in axial direction towards friction means 6 to 12 while spring steel plate 17 is resiliently deformed. In a normal disengaged position of the device, rotary member 16 abuts with a very small pressure produced by spring steel plate 17 against friction linings 8 and 10, while friction linings 7 and 9 abut rotary member 15. The key and groove connection 4,5 permits friction means 5 to 12 to assume a corresponding axial position.

Rotary member 15 serves as a pole disc and is formed with a circular groove 20 concentric with the axis of rotation of shafts 2 and 3. Electromagnetic means including a circular magnetizable body 21 and a winding 22 are located in the groove. The magnetizable body 21 has a U-shaped cross section and houses the circular winding 22 between two circular magnetizable leg portions 21a and 21b which are respectively located opposite circular inner surfaces of groove 20, spaced very small air gaps from the same. The air gaps are shown in FIG. 1 in an exaggerated manner, and are actually approximately 0.3 millimeter wide so that the magnetic flux 24, shown in FIG. 1 in broken lines, can easily flow along the entire circumference of the circular leg portions 21a and 21b into rotary member 15 which serves as a pole disc. The circular concentric edges of the magnetizable leg portions 21a and 21b are spaced from the bottom face of the circular groove 20 by a greater air gap so that the magnetic flux 24 flows along the illustrated path through pairs of sintered iron linings 7,8 in one direction through rotary member 16, and through pairs of linings 10,9 back into rotary member 15 and magnetizable body 21.

The circular magnetizable body 21 is secured by point welding, for example, to an annular disc 23 attached by screws 23a to the stationary crank shaft housing 1 so that electromagnetic means 21, 22 are stationary, and rotary member 15 rotates relative to the same.

Figure 3:
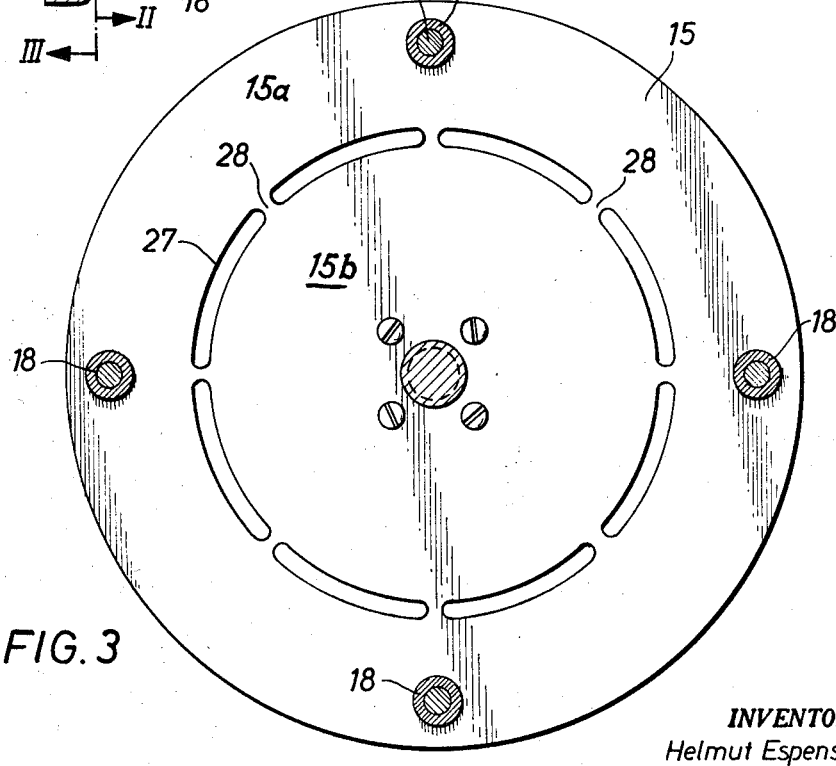
FIG. 3 is a side elevation, partially in section along line III–III in FIG. 1.

As best seen in FIG. 3, rotary member 15 is formed with a circular row of part-circular slots 27 separated by narrow portions 28. The circular row of slots 27 divides rotary member 15 into an outer annular portion 15a and a central portion 15b.

As best seen in FIG. 1, the diameter of the circle of slots 27 is smaller than the diameter of the outer leg portion 21a, and greater than the diameter of the inner leg portion 21b so that the circular leg portion 21a is located in the region of the outer annular portion 15a, and the inner circular leg portion 21b is located in the region of the inner central portion 15b of rotary member 15. As a result, the magnetic flux 24 cannot close within magnetizable member 15, but flows through portions 15a and 15b to and from the pairs of lining portions 7,8 and 9,10.

The radial strips 28 between slots 27 are sufficient for supporting the outer annular portion 15a, but are saturized at small magnetic field intensities so that they offer high magnetic resistance against the magnetic flux, and have only a negligible shunting effect on the magnetic flux flowing through the rotary member 15.

For the assumed polarity of the electromagnetic means 21,22, the magnetic flux flows from the circular magnetizable leg portion 21a into the annular portion 15a, from there through pairs of lining portions 7,8 and the respective axially extending connecting portions 70 connecting the same, then through rotary member 16 and pairs of lining portions 10,9 and the respective axially extending connecting portions 70 connecting the same into the inner central portion 15b of rotary member 15 and from there into the circular magnetizable leg portion 21b of the circular magnetizable body 21. The effect of the flux is that rotary member 16, against the action of spring steel disc 17, moves towards friction means 5 to 12 and presses the same against rotary member 15 so that the friction between rotary members 15 and 16 on the one hand, and the friction means 5 to 12 on the other hand is increased, and a torque is transmitted from shaft 2 driving rotary members 15 and 16,17 to shaft 3 which carries friction means 5 to 12.

In the illustrated embodiment, shaft 3 is rotated to drive a gear transmission, for example. However, if shaft 3 is held stationary, the rotary motion of members 15 and 16, 17 and of shaft 2 is braked.

Due to the good magnetic conductivity and low magnetic resistance of the sintered iron of the linings 7 to 10, and of connecting portions between the same, the pressing force exerted by member 16 and member 15 can be exactly determined by interrupting the electric current flowing through the winding 22 at a selected frequency for selected time periods so that winding is energized by impulses producing a regulatable amount of power so that the torque transmitted from rotary means 2, 15, 16, 17 to friction means 5 to 12 and shaft 3 can be regulated within a range between zero and a maximum torque determined by the dimensions of the device.

The clutch illustrated in FIGS. 1 to 3 has the advantage of a very simple construction, and requires practically no service even if operated for a long period of time. Consequently, the clutch is particularly suitable for transmitting torque to an automatic gear transmission of a motor car.

As noted above, the linings and connecting portions are directly attached to the disc 6 by molding sintered iron powder. It has been found particularly advantageous to apply very high pressure to the marginal peripheral portions of the linings whereby the marginal portion and edges of the linings are of a high density. In this manner, great resistance against chipping or breaking and good magnetic conductivity can be obtained.

It will be understood that each of the elements described above, or two or more together, may also find a useful application in other types of torque transmitting devices differing from the types described above.

While the invention has been illustrated and described as embodied in a clutch or brake including a disc provided with linings or facings consisting of molded sintered iron having magnetic permeability and great resistance to wear, it is not intended to be limited to the details shown, since various modifications and structural changes may be made without departing in any way from the spirit of the present invention.

We claim:

1. Torque transmitting device comprising two rotary members having a common axis and being spaced from each in axial direction; means for rotating at least one of said members about said axis; means mounting the other member for axial movement toward said one member, said one member having slots disposed along a circular line having its center in said common axis; a disc located between said members and being movable in axial direction; inner and outer concentric circular rows of axially aligned pairs of friction lining portions made of sintered iron and being located radially inward and outward, respectively, of said circular line of slots, said friction lining portions of each pair being secure to the opposite sides of said disc and confronting said members, respectively; and electromagnetic means including inner and outer nonrotatable concentric circular magnetizable portions adjacent said one member and being axially aligned with said inner and outer pairs of friction lining portions, and winding means between said magnetizable portions for generating a magnetic flux in said magnetizable portions so that the magnetic flux is closed through said outer magnetizable, member, outward of said circular line of slots through said one member, the outer pair of circular rows of friction lining portions, said other axially movable member, the inner pair of circular rows of friction lining portions, inward of said circular line of slots through said one member and said inner magnetizable member so that said slots separate flux portions flowing in opposite directions through said one member.

2. Torque transmitting device as claimed in claim 1 wherein said one rotary member has a circular groove concentric with said axis on the side remote from said disc; and wherein said electromagnetic means include a stationary circular magnetizable body having a U-shaped cross section open toward said disc, and housing said winding, said body having an annular yoke and two circular concentric legs constituting said inner and outer magnetizable portions; and wherein the annular edges of said circular legs are spaced from the bottom of said groove by a greater air gap than the outer circular surfaces of said legs are spaced from the lateral inner circular surfaces of said groove.

3. Torque transmitting device as claimed in claim 1 wherein said disc is formed with radial slots crossing said circular rows of pairs of lining portions and located between the same.

4. Torque transmitting device as claimed in claim 1, wherein the lining portions of each pair have substantially the same outline in the plane of said disc.

5. Torque transmitting device as claimed in claim 1, wherein said rotary members rotate in one direction of rotation; and wherein the ends of said lining portions leading in said direction of rotation are made of sintered iron having a higher density than the other parts of said lining portions.

6. Torque transmitting device as claimed in claim 1, wherein said lining portions are part-circular and have equal width in radial direction, and have marginal edge portions consisting of sintered iron of a higher density than the other parts of said lining portions.

7. Torque transmitting device as claimed in claim 1, wherein each said pair of lining portions has at least two anchoring connecting portions, and covers at least two cutouts in which said anchoring connecting portions are located.

8. Torque transmitting device as claimed in claim 1, wherein said one rotary member has a circular groove on the side remote from said disc; and wherein said electromagnetic means include a circular magnetizable body having said magnetizable portions, and a circular winding, said body and said winding being located in said groove.

9. Torque transmitting device as claimed in claim 8, comprising supporting means stationarily mounting said electromagnetic means.

10 Torque transmitting devices as claimed in claim 8, wherein said one rotary member has said groove on one side, and has on the other side a said circular row of slots open at the bottom of said groove and dividing said rotary member into an outer part and an inner part in which magnetic fluxes flow to and from said circular magnetizable portions, respectively.